3,105,830
STEROID HYDRAZONES AND HYDRAZIDES
Otto Halpern, Mexico City, Mexico, and Howard J. Ringold, Shrewsbury, Mass., assignors, by mesne assignments, to Syntex Corporation, a corporation of Panama
No Drawing. Filed Mar. 24, 1961, Ser. No. 98,018
20 Claims. (Cl. 260—239.5)

The present invention relates to cyclopentanophenanthrene compounds.

More particularly the present invention relates to nicotinyl- and isonicotinylhydrazones and -hydrazides of 3-keto compounds of the androstane series and 20-keto compounds of the pregnane series.

The novel compounds of the present invention are represented by the following formulas:

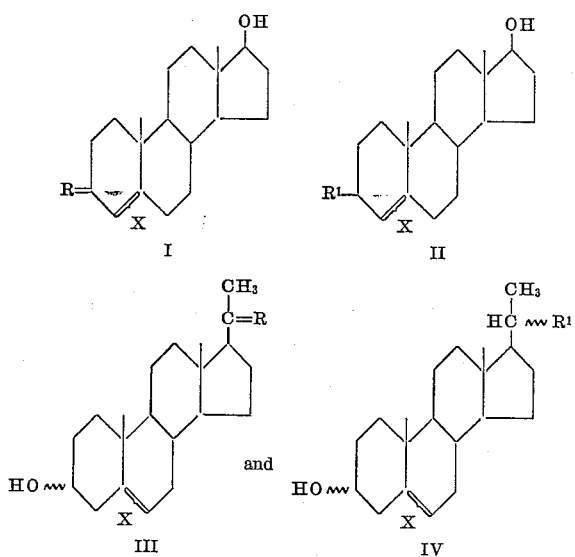

In the above formulas X represents either a double bond or a saturated linkage and in this case the compounds may be C–5 normal or allo. R represents either the isonicotinylhydrazide residue of the following formula:

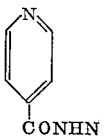

or the nicotinylhydrazide residue of the following formula:

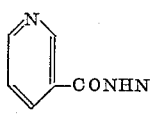

$R^1$ represents either residue of nicotinylhydrazine of the following formula:

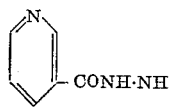

or the residue of isonicotinylhydrazine of the following formula:

The wavy line at C–3 and C–20 represents either the α- or β-configuration.

The androstane derivatives indicated as Formulas I and II above are active hormones useful as anabolic agents since they have a favorable anabolic-androgenic ratio and are also useful as pituitary suppressant and anti-estrogenic agents.

The pregnane derivatives of Formulas III and IV are anti-ovulatory agents, progestational agents, anti-estrogenic agents and anti-androgenic agents.

The novel compounds of the present invention are prepared by a process involving in general the reaction of the 3-keto group or the 20-keto group with either isonicotinyl or nicotinylhydrazide to form the hydrazones of the Formulas I or III followed by reduction of the hydrazone with sodium borohydride to form the corresponding hydrazines II or IV.

The following specific examples serve to illustrate but are not intended to limit the present invention:

*Example I*

1 g. of allopregnan-3β-ol-20-one and 1 g. of isonicotinylhydrazide were mixed with 20 cc. of methanol and 2 cc. of acetic acid and heated under reflux for 1 hour. After cooling, the precipitate formed was filtered, washed with methanol and dried, yielding 1.3 g. of the isonicotinylhydrazone of allopregnan-3β-ol-20-one. This compound had a melting point of 247–52° C.; $[\alpha]_D$ +20° (dioxane); λ max. 268–70 mμ log ε=3.99.

*Example II*

Treating the following ketones in exactly the same way as described in Example I, there were obtained the corresponding isonicotinylhydrazones:

Δ⁵-pregnen-3β-ol-20-one, allopregnan - 3α - ol - 20 - one, pregnan-3α-ol-20-one, pregnan-3β-ol-20-one, Δ⁴-androsten-17β-ol-3-one, testan-17β-ol-3-one (5β-androstan-17β-ol-3-one), androstan-17β-ol-3-one.

*Example III*

1.12 g. of the isonicotinylhydrazone of allopregnan-3β-ol-20-one was dissolved in a mixture of 100 cc. of tetrahydrofuran and 50 cc. of methanol and cooled in an ice-bath. A solution of 1.5 g. of sodium borohydride in 15 cc. of water was added and the resulting mixture was kept at low temperature for 30 minutes, then overnight at room temperature. The excess reagent was neutralized with acetic acid and the solution poured into water. The precipitate formed was collected and recrystallized from acetone, thus affording 415 mg. of a compound which had a melting point of 221–2° C.; $[\alpha]_D$ +10 (dioxane); λ max. 266–8, log ε=3.72.

Chromatography afforded two products: 20α-isonicotinylhydrazo-allopregnan-3β-ol and 20β-isonicotinylhydrazo allopregnan-3β-ol.

Example IV

Following exactly the same method as described in Example III, there were reduced the isonicotinylhydrazones set forth below, yielding the corresponding derivatives disclosed hereafter:

| Isonicotinylhydrazone of— | Reaction Product(s) |
|---|---|
| Δ⁵-pregnen-3β-ol-20-one | 20β-isonicotinylhydrazo-Δ⁵-pregnen-3β-ol. 20α-isonicotinylhydrazo-Δ⁵-pregnen-3β-ol. |
| allopregnan-3α-ol-20-one | 20β-isonicotinylhydrazo allopregnan-3α-ol. 20α-isonicotinylhydrazo allopregnan-3α-ol. |
| pregnan-3α-ol-20-one | 20β-isonicotinylhydrazo pregnan-3α-ol. 20α-isonicotinylhydrazo pregnan-3α-ol. |
| pregnan-3β-ol-20-one | 20β-isonicotinylhydrazo pregnan-3β-ol. 20α-isonicotinylhydrazo pregnan-3β-ol. |
| Δ⁴-androsten-17β-ol-3-one | 3β-isonicotinylhydrazo-Δ⁴-androsten-17β-ol. |
| testan-17β-ol-3-one (5β-androstan-17β-ol-3-one) | 3β-isonicotinylhydrazo testan 17β-ol. |
| androstan-17β-ol-3-one | 3β-isonicotinylhydrazo androstan-17β-ol. |

Example V

Using exactly the same conditions described in Example I, except that isonicotinylhydrazide was substituted by nicotinylhydrazide, there were obtained the corresponding nicotinylhydrazones of the folowing ketones:

Allopregnan-3β-ol-20-one, Δ⁵-pregnen-3β-ol-20-one, allopregnan-3α-ol-20-one, pregnan-3α-ol-20-one, pregnan-3β-ol-20-one, Δ⁴-androsten-17β-ol-3-one, testan-17β-ol-3-one (5β-androstan-17β-ol-3-one), androstan-17β-ol-3-one.

Example VI

Treating the following nicotinylhydrazones exactly in the same way as described in Example III, there were obtained the corresponding derivatives set forth below:

| Nicotinylhydrazone of— | Reduction Product(s) |
|---|---|
| allopregnan-3β-ol-20-one | 20β-nicotinylhydrazo allopregnan-3β-ol. 20α-nicotinylhydrazo allopregnan-3β-ol. |
| Δ⁵-pregnen-3β-ol-20-one | 20β-nicotinylhydrazo-Δ⁵-pregnen-3β-ol. 20α-nicotinylhydrazo-Δ⁵-pregnen-3β-ol. |
| allopregnan-3α-ol-20-one | 20β-nicotinylhydrazo allopregnan-3α-ol. 20α-nicotinylhydrazo allopregnan-3α-ol. |
| pregnan-3α-ol-20-one | 20β-nicotinylhydrazo pregnan-3α-ol. 20α-nicotinylhydrazo pregnan-3α-ol. |
| pregnan-3β-ol-20-one | 20β-nicotinylhydrazo pregnan-3β-ol. 20α-nicotinylhydrazo pregnan-3β-ol. |
| Δ⁴-androsten-17β-ol-3-one | 3β-nicotinylhydrazo-Δ⁴-androsten-17β-ol. |
| testan-17β-ol-3-one | 3β-nicotinylhydrazo testan-17β-ol. |
| androstan-17β-ol-3-one | 3β-nicotinylhydrazo androstan-17β-ol. |

We claim:

1. The isonicotinylhydrazone of a keto steroid compound of the androstane series selected from the group consisting of testosterone, androstan-17β-ol-3-one and testan-17β-ol-3-one.
2. The isonicotinylhydrazone of testosterone.
3. The nicotinylhydrazone of a keto steroid compound of the androstane series selected from the group consisting of testosterone, androstan-17β-ol-3-one and testan-17β-ol-3-one.
4. The nicotinylhydrazone of androstan-17β-ol-3-one.
5. The isonicotinylhydrazone of a keto steroid compound of the pregnane series selected from the group consisting of Δ⁵-pregnen-3-ol-20-one and allopregnan-3-ol-20-one.
6. The isonicotinylhydrazone of allopregnan-3β-ol-20-one.
7. The nicotinylhydrazone of a keto steroid compound of the pregnane series selected from the group consisting of Δ⁵-pregnen-3-ol-20-one and allopregnan-3-ol-20-one.
8. The nicotinylhydrazone of allopregnan-3α-ol-20-one.
9. A compound of the following formula:

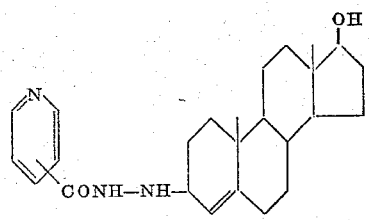

10. 3β-isonicotinylhydrazo-Δ⁴-androsten-17β-ol.
11. A compound of the following formula:

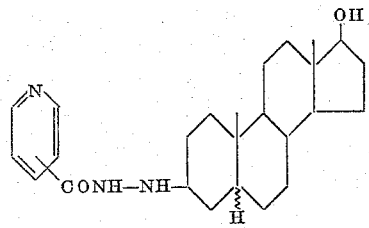

12. 3β-isonicotinylhydrazo testan-17β-ol.
13. 3β-nicotinylhydrazo androstan-17β-ol.
14. A compound of the following formula:

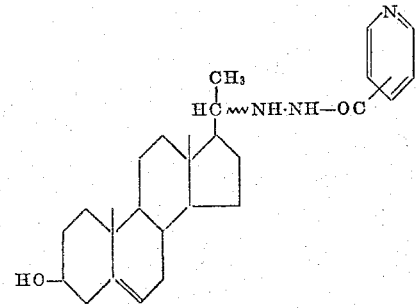

15. 20β-isonicotinylhydrazo-Δ⁵-pregnen-3β-ol.
16. A compound of the following formula:

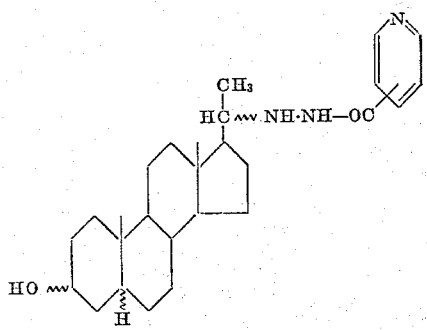

17. 20α-isonicotinylhydrazo allopregnan-3β-ol.
18. 20β-isonicotinylhydrazo allopregnan-3β-ol.

19. A compound of the formula:
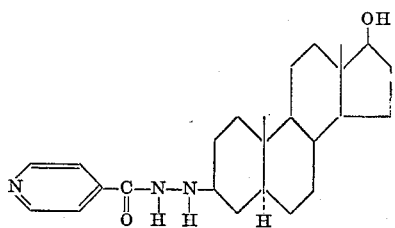
20. A compound of the formula:
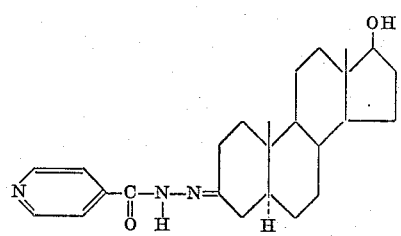
No references cited.